United States Patent [19]

Counihan

[11] Patent Number: 4,599,842
[45] Date of Patent: Jul. 15, 1986

[54] PLANAR SECTION FASTENING SYSTEM

[76] Inventor: James Counihan, Rte. 4, Box 225-A, Blakely Ave., Piedmont, S.C. 29673

[21] Appl. No.: 642,073

[22] Filed: Aug. 20, 1984

[51] Int. Cl.⁴ .......................... F04B 1/38; F04C 1/10; F16B 35/04
[52] U.S. Cl. ....................................... 52/586; 52/512; 411/424; 411/482
[58] Field of Search ................ 52/582, 585, 586, 391, 52/512, 541, 393, 385, 774, 778, 732; 411/487, 490, 482, 455, 439, 424, 378

[56] References Cited

U.S. PATENT DOCUMENTS

| 582,645 | 5/1897 | Heaton | 52/512 |
|---|---|---|---|
| 1,888,611 | 11/1932 | Wolfson | 52/512 |
| 1,889,138 | 11/1932 | Wolfson | 52/586 X |
| 1,946,646 | 2/1934 | Storm | 52/586 X |
| 2,066,205 | 12/1936 | Keating | 52/778 X |
| 2,142,305 | 1/1939 | Davis | 52/582 X |
| 2,158,732 | 5/1939 | Shannon | 52/586 X |
| 2,307,348 | 1/1943 | Anderson | 411/487 |
| 3,208,328 | 9/1965 | Myers | 411/487 X |
| 3,720,027 | 3/1973 | Christensen | 52/393 X |
| 3,731,956 | 5/1973 | Hanley | 52/582 |

FOREIGN PATENT DOCUMENTS

| 471438 | 9/1937 | United Kingdom | 52/391 |
|---|---|---|---|
| 2124672 | 2/1984 | United Kingdom | 52/391 |

Primary Examiner—Stuart S. Levy
Assistant Examiner—Lynn M. Sohacki
Attorney, Agent, or Firm—Cort Flint

[57] ABSTRACT

A fastening system (10) for fastening planar sections (11, 12) such as flooring boards to a base surface (14) comprising a fastening strip (13) that interlockingly engages in a set of grooves (30) cut in the ends of the boards (11, 12). The fastening strip (13) is mounted on a resilient layer of material (28) that is interposed between the fastening strip (13) and the base surface (14). The layer of resilient material (28) allows the flooring boards (11, 12) and the fastening strip (13) to move in response to loading on the flooring boards (11, 12). Fastening members (15) that accommodate the movement without becoming loosened attach the fastening strips (13) to the base surface (14).

15 Claims, 11 Drawing Figures

PLANAR SECTION FASTENING SYSTEM

BACKGROUND OF THE INVENTION

This invention relates to a system for fastening planar sections such as flooring boards to a base surface. More particularly, it relates to a fastening joint comprised of a one piece fastening strip which works in conjunction with a series of grooves cut into the sides and ends of flooring boards to produce a secure attachment of the flooring boards to a base surface such as concrete.

Normally, panels or other planar sections are installed by interlocking members carried on the panels themselves or by fasteners such as nails or screws driven through the surface of the panel, thereby detracting from its appearance. Also, the conventional panel fastening devices such as interlocking joints, nails and screws do not allow for the panels to flex freely under loads without damaging the panels or breaking loose the fasteners.

The use of a hidden fastening strip to attach flooring boards to a base surface, is known in U.S. Pat. Nos. 1,889,138 and 582,645. However, the above patents disclose a fastening strip that rigidly fixes the flooring boards to a base surface. No provision is made for allowing the boards to flex while remaining fixed with respect to one another by fasteners. Thus, in applications where it is desired to have flexible planar surfaces, such as gym and factory floors, a fastening system is required that will allow the surfaces to flex and at the same time keep the surface panels fixed relative to one another and attached to the base surface.

The prior flooring systems have also been relatively labor intensive in their installation. Methods to expedite installation of flooring systems have resulted in floor boards being left loosely installed.

Accordingly, an important object of the present invention is to provide a fastening system that allows a plurality of planar flooring sections to be securely fixed to a base surface and that is hidden from view.

Another important object of the present invention is to provide a fastening system for a plurality of planar sections that allows the sections to flex and at the same time keeps the sections fixed relative to one another and attached to the base surface.

Yet another important object of the present invention is to provide a fastening system for a plurality of planar flooring sections that will give the flooring uniform cushioning characteristics.

Still another important object of the present invention is to provide a fastening system for a plurality of planar floor sections that is simple and easy to install.

SUMMARY OF THE INVENTION

The above objectives are accomplished according to the present invention by a flooring and fastening system which includes a one-piece fastening strip attached to the base surface that engages grooves in the ends of the planar sections. A recess that is provided below the groove in each end of the planar section accommodates the thickness of the fastening strip and allows the top surfaces of the planar surfaces being joined to abut one another, thereby providing a smooth connection surface and hiding the fastening strip below. A resilient layer of material interposed between the fastening strips and the base surface allows the strips and thus the planar sections attached to strips to flex resiliently under loading. The fastening members used to attach the fastening strips to the base surface through the resilient layer are adapted to allow movement of the fastening strip holding the planar sections, while remaining attached to the base surface. The fastening members are nails or screws which have a reduced cross-sectional portion on their shank just below the nail or screw head. The fastening strips may be provided with small guide holes through which the fastening members are driven into the base surface. The fastening strips may move relatively unrestrained about the reduced cross-sectional portion of the fastening member without applying force to the fastening member that would tend to loosen it from the base surface. Thus, the planar sections may move under loading pursuant to the cushioning effect of the resilient layer and at the same time remain fixed relative to one another and attached to the base surface. Lateral movement of the planar sections relative to one another is prevented by a longitudinal upturned edge on the base of the fastening strip that engages a transverse rabbet groove on the underside of the planar section. Because the planar sections are held side-by-side on the fastening strips, they do not move independently of one another but move together, thereby giving the floor, wall, or ceiling comprised of the planar sections uniform cushioning characteristics.

The present fastening system utilizes simple fastening strips and fastening members for attaching planar sections to a base surface. Since the fastening strips engage a plurality of planar sections simultaneously, the planar sections must be of uniform length. The uniform length of the planar sections allows for a fast row-by-row installation of the fastening strips and then, the planar sections to the base surface.

BRIEF DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

This invention relates to a flooring and fastening system for resiliently attaching a plurality of planar flooring sections A to a base surface such as a concrete slab by means of fastening strips B and fastening members C. Flooring systems of this type are commonly used in gyms and factories.

Figure 1:
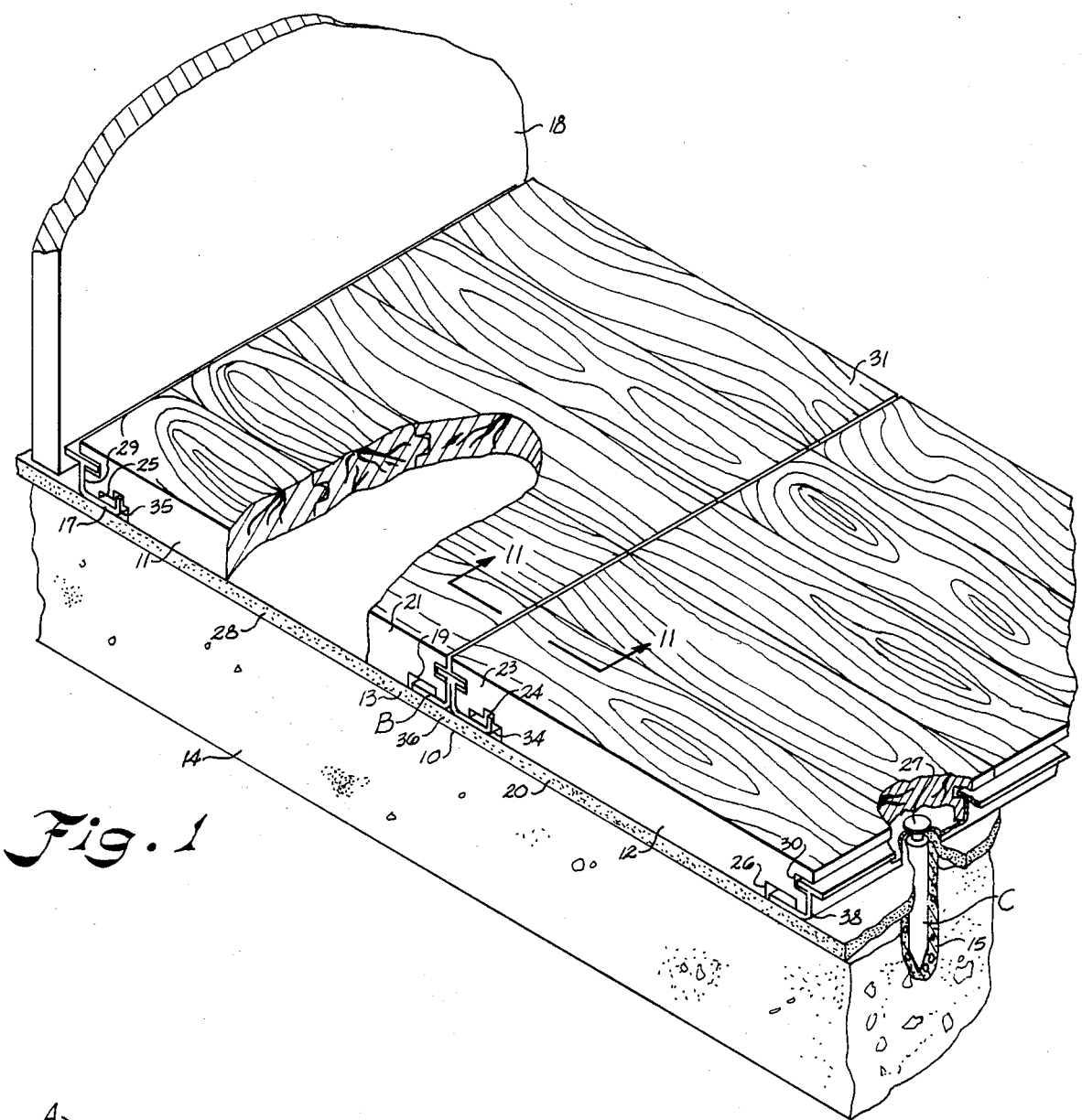
FIG. 1 is a perspective view illustrating a fastening system having a fastening strip constructed in accordance with the present invention.

Referring now to FIG. 1 of the drawings, there is illustrated a preferred embodiment of a planar section fastening system 10 in accordance with the present invention. To illustrate the flooring and fastening system of the present invention, the installation and joining of two planar flooring sections will be described, it being understood that the flooring system may be completed by repeating the fastening and joining of as many flooring sections as needed to cover any area desired to be floored.

A first planar section 11 is joined with a second planar section 12 by a double wing fastening strip 13. The fastening strip 13 is attached to a concrete slab base surface 14 by a plurality of fastening members 15. Interposed between the fastening strip 13 and the base surface 14 is a layer of resilient material 28 that provides cushioning for the planar sections 11, 12. A single wing fastening strip 17 is used to fasten the first planar surface 11 to the base surface 14 adjacent to an abutment or wall 18.

A rabbet 19 that runs transversely across the bottom surface 20 is spaced slightly from the first end 21 of the first planar section 11 and accommodates a second horizontal base portion 22 of the double wing fastener 13. Slightly spaced from the second end 23 of the second planar section 12 on bottom surface 20 is another rabbet 19, for accommodating a first horizontal base portion 34 of the double wing fastener 13, having a rabbet groove 24 in the horizontal side 25 of the rabbet 19 that runs longitudinally for the length of the rabbet 19. The rabbet groove 24 accepts an upturned edge 35 of the first base portion 34. Each rabbet 19 also has two vertical sides 26 in addition to the horizontal side 25, which give the rabbet depth to accommodate the head 27 of a fastening member 15 so that the bottom surface 20 of the planar sections 11, 12 rests primarily on a layer of resilient material 28.

The recess 29 that spans transversely across each end 21, 23 of the planar sections 11, 12 is smooth and substantially vertical and provides a space for a vertical stem member 38 of the fastening strip 13 to be carried between the ends 21, 23 of the planar sections 11, 12 so that facing edges of the top surface 31 of the planar sections 11, 12 may contact. The recess 29 runs from the bottom surface 20 of each planar section 11, 12 to a transversely running planar section end groove 30 located approximately midway between the top surface 31 and bottom surface 20 of both the first and second ends 21, 23 of the planar sections 11, 12. Groove 30 provides groove means for interlocking the ends of the planar sections A.

Tongue means for engaging the end groove 30 in first end 21 of the first planar section 11 includes first tongue 32 of the double wing fastening strip 13. The tongue means further includes a second tongue 33 for engaging the end groove 30 in the second end 23 of the second planar section 12. First tongue 32 and second tongue 33 of the double wing fastening strip 13 create an interlocking joint arrangement 36 between the ends 21, 23 of the planar sections 11, 12 and the double wing fastening strip 13.

Figure 4:
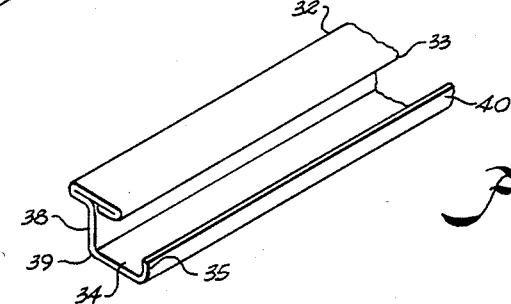
FIG. 4 is a perspective view of a single wing fastening strip having a first horizontal base portion.

Referring to FIG. 4 of the drawings, the single wing fastening strip 17 is illustrated. The single wing fastening strip 17 is usually used when it is desired to place the second ends of the planar sections 11, 12 up against a vertical surface such as a wall 18. However, the single wing fastening strip 17 may also be used to attach adjacent ends of the planar sections 11, 12. Normally, installation of the planar sections begins against a wall 18, so the single wing fastening strip 17 would be the first fastening strip attached to the base surface 14. A first horizontal base portion 34 receives the fastening members 15 which hold the single wing fastening strip 17 to the base surface 14. A vertical member 38 extends from a first edge 39 of the first base portion 34 and is accommodated by the recess 29 in the second end 23 of the first planar section 11. Two co-planar tongues 32, 33 are carried by the top portion of the vertical stem member 38 for engagement with end grooves 30 of the planar sections. An upturned edge 35 formed from a second edge 40 of the first horizontal base portion 34 runs longitudinally for the length of the first base portion 34 and prevents lateral shifting of the planar sections through engagement within the rabbet groove 24.

Figure 2:
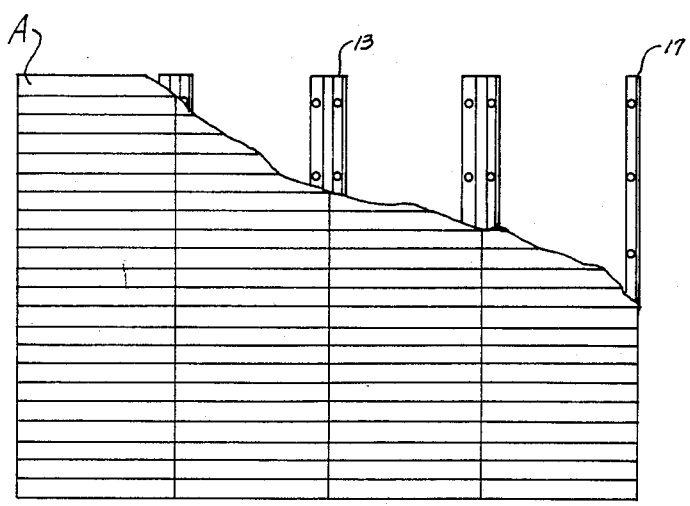
FIG. 2 is a plan view of the planar section fastening system with parts cut away.
Figure 3:
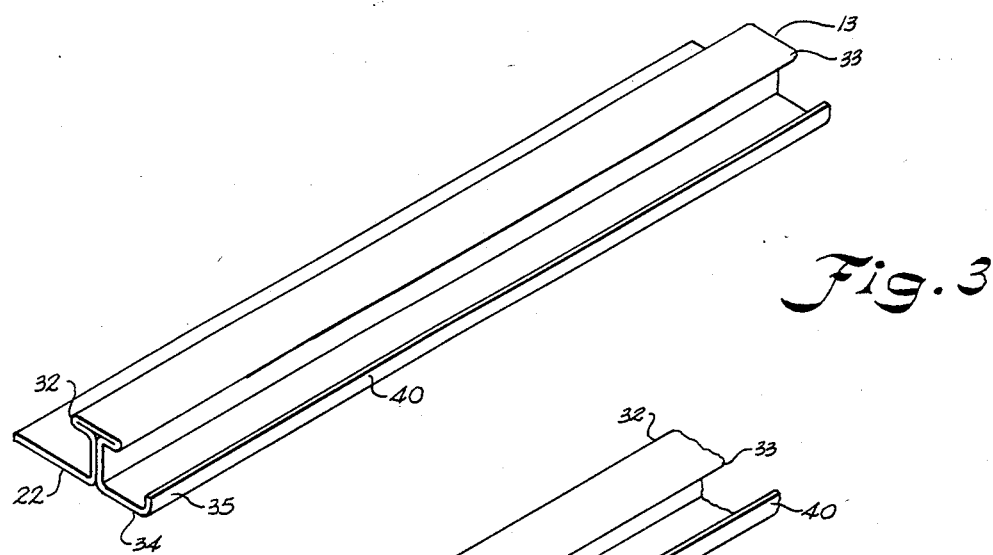
FIG. 3 is a perspective view of a double wing fastening strip having first and second horizontal base portions.

Referring to FIG. 3 of the drawings, the double wing fastening strip 13 is illustrated. The double wing fastening strip 13 is used when the ends of two adjacent planar sections 11, 12 are to be joined. The first horizontal base portion 34 of the double wing fastening strip 13 carries an upturned edge 35, formed from the second edge 40, for engagement in the rabbet groove 24 in the second end 23 of the second planar section 12. A second horizontal base portion 22 extends under the first end 21 of the first planar section 11 into a rabbet 19. The rabbet 19 is cut to a depth that allows room for the head 27 of a fastening member so that the head 27 does not contact the horizontal side 25 of the rabbet 19 when the planar sections have no load on them. The first tongue 32 carried by the vertical stem member 38 engages in the end groove 30 of the first end 21 of the first planar section 11, and the second tongue 33 engages in the end groove 30 of the second end 23 of the second planar section 12 to create an interlocking joint arrangement between the planar sections 11, 12 that is hidden from view. FIG. 2 illustrates how the fastening strips are hidden from view upon installation of the planar sections.

Figure 6:
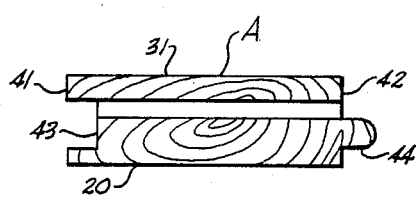
FIG. 6 is an elevated end view of a planar section.
Figure 7:
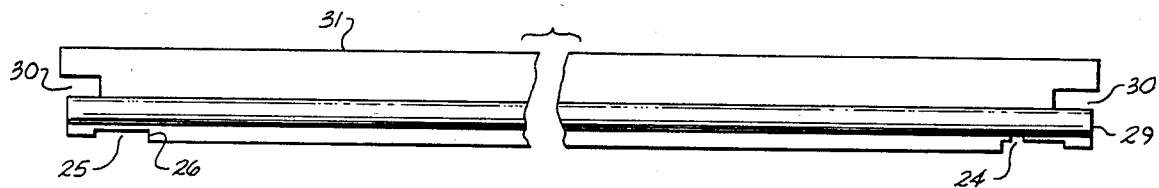
FIG. 7 is a side elevational view of a planar section.

In FIG. 6 of the drawings, an end view of a planar section is illustrated. Each planar section has a first side 41 and a second side 42 which are substantially parallel to one another. The first side 41 of each planar section may have a side groove 43 located approximately midway between the top surface 31 and the bottom surface 20 that runs longitudinally for the length of the planar section. The second side 42 of each planar section then has a side ridge 44 located aproximately midway between the top surface 31 and the bottom surface 20 that also runs longitudinally for the length of the planar section. When the planar sections 11, 12 are installed side-by-side with their ends 21, 23 engaged in a fastening strip, the first and second sides 41, 42 of the planar sections cooperate such that the ridge 44 of the second side 42 engages the side groove 43 of the first side 41 to form an interlocking connection that runs the length of the planar sections. Thus, the planar sections are fixed at both ends by the fastening strips, at both sides by the ridge 44 and side groove 43, and on the bottom by the upturned edge 35 of the fastening strip engaged in rabbet groove 24. A secure, easy to install flooring system is thus provided. The upturned edge 35 interlocked in rabbet groove 24 prevents lateral shifting that often occurs through stopping and starting on gym floors and shifting of heavy equipment on factory floors.

Figure 5:
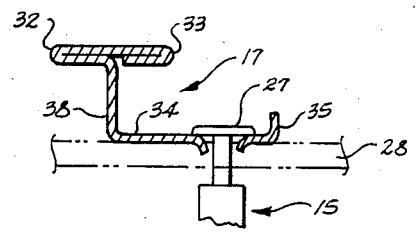
FIG. 5 is an elevated cross-sectional view of a single wing fastening strip fastened to a base surface.
Figures 8, 9, 10:
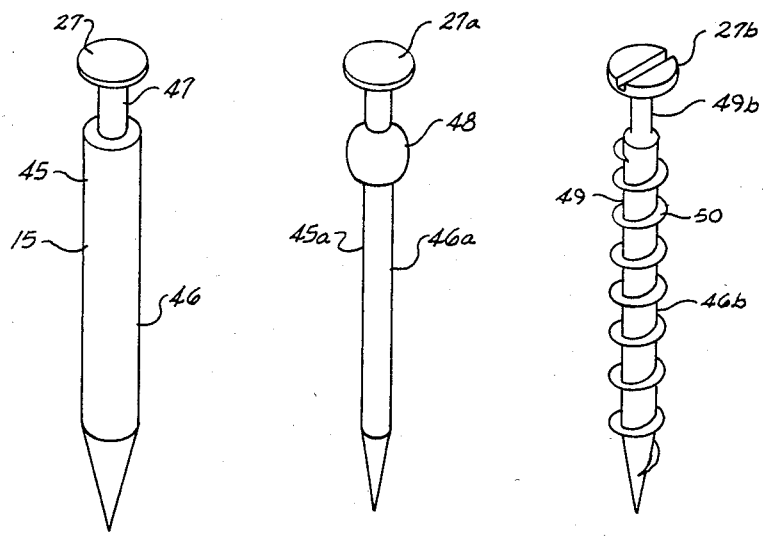
FIGS. 8, 9, and 10 are perspective views of alternate embodiments of a fastening member.

In FIG. 8 of the drawings, a preferred embodiment of the fastening member 15 is illustrated as including a nail 45 having a head 27 and a shank portion 46. The shank portion 46 adjacent to and directly below the head 27 has a reduced cross-section 47. The fastening strip and the rigidly attached planar sections may move freely about the reduced cross-section 47 of the nail 45 without applying force to the nail that would tend to loosen it from the base surface 14. As shown in FIG. 5, relative movement is permitted between the strip and the nail. The planar sections can flex and move upon the resilient layer 28 interposed between the fastening strips and the base surface 14 without loosening the connection between the planar sections 11, 12 and the base surface 14. In the typical installation, conventional nails are driven through the strips. The strips bind on the nail shanks driven through them. Movement of the floor boards causes movement of the nails in the subfloor 14 and eventual loosening of the fastener. Alternately, if the nail does not move, a rigid floor is provided by binding of the strip on the nail, and cushion 28 is useless.

Figure 11:
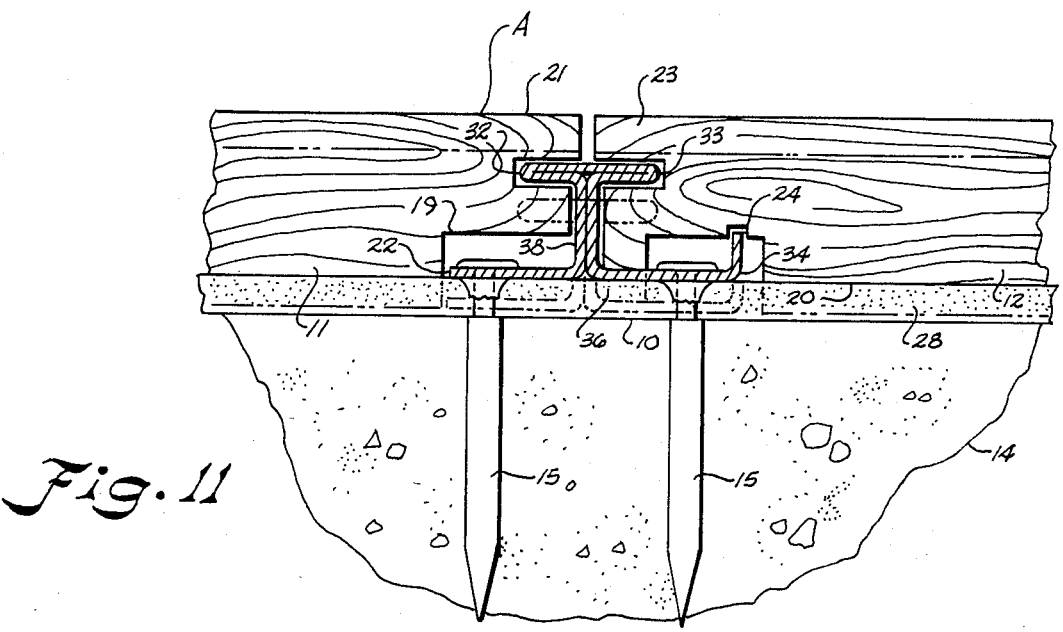
FIG. 11 is a sectional view of a fastening and flooring system at a joint thereof according to the invention.

For the above purposes, there must be a sufficient clearance space 60 (See FIG. 11) above the head of the fastening member C, such as head 27, and the bottom of the horizontal side 25 of the rabbet 19. This space must allow the base of the strips B to slide over the shank 47 of the nail sufficiently before the side 25 abuts the nail head.

In FIG. 9, of the drawings, an alternate embodiment of the fastening member 15 is illustrated. The nail 45a has a circumferential ridge 48 spaced below the head 27a on shank 46a. This circumferential ridge 48 increases the diameter of the opening created in the fastening strip as the nail 45a is driven through the fastening strip. The increased diameter opening allows the fastening strip and the attached planar sections to move freely about the shank 46a portion between the head 27a and the circumferential ridge 48. Alternately, a nail having a cone-shaped shank (not shown), the base of the cone being at the same location as the circumferential ridge 48 and the tip of the cone being at the penetration end of the nail, could be used to achieve the same satisfactory results as is accomplished with a nail having a circumferential ridge.

In FIG. 10 of the drawings is illustrated another alternate embodiment of the fastening member 15. The screw 49, like the nail 45a in FIG. 9, has a reduced cross-section 47b in its shank 46b between the head 27b and the threads 50. The reduced cross-section 47b allows the fastening strip and the attached planar sections to move about the upper portion of the screw 49 without applying forces to the screw 49 that would tend to loosen it from the base surface 14.

In installing the flooring and fastening system, a single wing fastener strip 17 is fastened with fastening members C to the base surface 14 adjacent a wall 18. A double wing fastening strip 13 is then fastened to the base surface at a distance away from the wall equal approximately to the length of a planar section A. Next, a planar section A is placed between the strips 17 and 13 at a slight twisted angle so that it lies between the strips. Next, the planar flooring section is twisted so that it becomes straight between the flooring strips 17 and 13 and has its end 23 interlocked with the strip 17 and its end 21 interlocked in the strip 13. If need be, the horizontal flange 34 of the double wing strip 13 may be left unsecured while the first flooring sections A are installed. This allows some flexibility of the interlocking tongues 32 and 33 by lifting up the flange 34 as the ends 21 of the flooring sections are twisted and interlocked. If this is the case, after the first flooring sections A are installed, the horizontal base flange 34 may be secured by fastening members 15. Next, another fastening strip 13 is installed by securing its horizontal base portion 22 to the base surface 14 at a distance away from the previously installed fastening strip 13 which is equal approximately to the length of the flooring sections A. A next row of flooring sections A are then twisted and interlocked between the two double wing strips 13. Continuing in this manner, the planar sections are installed in rows side-by-side with their ends interlocking in the fastening strips B until a desired surface is covered. Enough flexure is provided by the fastening strips that the upturned edge 35 pops within the groove 24 when the flooring sections A are twisted from their slight angular configuration to a straight configuration between the strips B.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein disclosed.

What is claimed is:

1. A flooring and fastening system for attaching planar sections of flooring and the like to a base surface comprising generally rectangular planar sections each having a top surface, a bottom surface, a first end and a second end;

the top and bottom surfaces being substantially parallel to one another and the end surfaces being substantially parallel to one another;

each of the planar sections having on both the first end and the second end a groove running transversely across the width of the planar sections located approximately midway between the top surface and the bottom surface of the planar sections;

each of the planar sections having on both the first end and the second end a smooth vertical recess extending from the bottom surface of the planar section to the groove on the end of the planar section, the vertical recess on the first end being parallel to the vertical recess on the second end;

each of the planar sections having on the bottom surface two rabbets that extend transversley across the width of the planar section, one of the rabbets being adjacent the first end and the other rabbet being adjacent the second end, each of the two rabbets having two vertical sides and one horizontal side;

fastening strips for fastening the planar sections to the base surface having a horizontal base means, a vertical stem member extending from the base means substantially perpendicular thereto, the vertical stem member having a first tongue and a second tongue, the second tongue extending in the same plane and in opposite direction of the first tongue;

a joint arrangement connecting the end of a first planar section with the end of a second planar section where the first tongue is disposed in the groove in the first end of the first planar section, and the second tongue is disposed in the groove in the second end of the second planar section, said vertical stem member being received between said vertical recesses of said first and second ends, thereby providing an interlocking connection between adjacent planar sections which allows the planar sections to be attached to the base surface by the fastening strips;

fastening members for attaching the fastening strips to the base surface;

the fastening strip having an upturned edge that runs longitudinally for the length of each fastening strip formed from an edge of the base means opposite from and parallel to the vertical stem member; and a rabbet groove formed in the horizontal side of said rabbet on the second end of each said planar section that runs longitudinally for the length of said rabbet and said rabbet groove being arranged such that upon attaching of the first and second planar sections to the fastening strip, the upturned edge of the fastening strip protrudes into the rabbet groove of the second planar section which is continuous in a manner that said rabbet groove slides continuously over said upturned edge for installation, and thereby prevents lateral shifting of the planar sections by further fixing the planar sections with respect to each other.

2. A fastening system as in claim 1, wherein the base means of the fastening strip includes a first horizontal base portion on one side of the vertical member and a second horizontal base portion on the other side of the vertical member; the first base portion carrying the upturned edge, and the second base portion being substantially flat.

3. A fastening system as in claim 1, wherein each planar section has a first side and a second side, the first side having a groove located approximately midway between the top surface and the bottom surface that runs longitudinally for the length of the planar section, the second side having a ridge located approximately midway between the top surface and the bottom surface that runs longitudinally for the length of the planar section, whereby upon installation, the ends of the planar sections engage the fastening strips and the ridges on the second side of the planar sections engage the grooves on the first side of adjacent planar sections in an interlocking relationship.

4. A fastening system as in claim 1, further comprising a layer of resilient material interposed between the fastening strips and the base surface providing cushioning for the planar sections.

5. A fastening system as in claim 4, wherein the fastening members are nails, each having a head and a shank portion, and wherein a portion of the shank adjacent the head is of reduced cross-section as compared to a remaining portion of the shank for allowing the fastening strips and the planar sections rigidly attached to the fastening strips to move freely relative to the nails about the reduced cross-section portion of the nail on the resilient material interposed between the fastening strips and the base surface, thereby providing more uniform cushioning characteristics for the floor system.

6. A fastening system as in claim 4, wherein the fastening members are nails, each having a head and a shank portion, wherein spaced below the head, a circumferential ridge is carried on the shank portion such that upon driving of the nail through the fastening strip, the circumferential ridge increases the diameter of the hole in the fastening strip as the nail is driven through, thereby allowing the fastening strips and the planar sections rigidly attached to the fastening strips to move relative to the shank portion of the nail that is between the head and the circumferential ridge.

7. A fastening system as in claim 4, wherein the fastening members are screws, each having a head and a shank portion, and wherein a portion of the shank adjacent the head is of reduced cross-section as compared to the rest of the shank for allowing the fastening strips and the planar sections rigidly attached to the fastening strips to move freely relative to the screws about the reduced cross-section portion of the screw on the resilient material interposed between the fastening strips and the base surface, thereby providing more uniform cushioning characteristics for the floor system.

8. A flooring and fastening system for attaching planar sections of flooring and the like to a base surface wherein the rectangular planar sections are the type having a top surface, a bottom surface, a first end and a second end; the top and bottom surfaces being substantially parallel to one another and the end surfaces being substantially parallel to one another; groove means for adjoining said first and second ends of adjacent planar sections together; said system comprising:

each of the planar sections having on the bottom surface two rabbets that extend transversely across the width of the planar section, one of the rabbets being adjacent the first end and the other rabbet being adjacent the second end, each of the two rabbets having two vertical sides and one horizontal side;

fastening strips for fastening the planar sections to the base surface having an attachment base means, and interlocking tongue means for interlocking with said groove means of said first and second ends;

a layer of resilient material interposed between the fastening strips and the base surface providing cushioning for the planar sections;

fastening members having heads for attaching the fastening strips to the resilient material and the base surface;

a clearance space between said horizontal side of said rabbet and said head of said fastening members to allow said planar sections to move downwardly under load against said resilient material; and each said fastening member having a forward enlarged shank element for penetrating the fastening strips and a reduced shank portion adjacent the head of said fastening member for fastening said fastening strips, said reduced shank being reduced in diameter relative to said enlarged shank element allowing said attachment base means to move freely relative to the fastening member on the resilient material interposed between the fastening strip and the base surface, thereby providing more uniform cushioning characteristics for the floor system.

9. A fastening system as in claim 8 wherein the fastening members are nails, each having a head and a shank portion, and wherein a portion of the shank adjacent the head is of reduced cross-section as compared to the rest of the shank for allowing the fastening strips and the planar sections rigidly attached to the flooring strips to move freely relative to the nails about the reduced cross-section portion of the nail on the resilient material interposed between the fastening strips and the base surface thereof providing more uniform cushioning characteristics for the floor system.

10. A fastening system as in claim 8 wherein the fastening members are screws, each having a head and a shank portion, and wherein a portion of the shank adjacent the head is of reduced cross-section as compared to the rest of the shank for allowing the fastening strips and the planar sections rigidly attached to the flooring strips to move freely relative to the screws about the reduced cross-section portion of the screw on the resilient material interposed between the fastening strips and the base surface, thereby providing more uniform cushioning characteristics for the floor system.

11. A fastening system for attaching planar sections of flooring and the like to a base surface wherein said planar sections are of the type which includes a rectangular planar section each having a top surface, a bottom surface, a first end and a second end; the top and bottom surfaces being substantially parallel to one another and the end surfaces being substantially parallel to one another; groove means for adjoining first and second ends of adjacent planar sections together; each of the planar sections having on the bottom surface two rabbets that extend transversely for the width of the planar section, one of the rabbets being spaced slightly from the first end and the other rabbet being spaced slightly from the second end, each of the two rabbets having two vertical sides and one horizontal side; fastening strips for fastening the planar sections to the base surface having an attachment base means for attaching said base means to said base surface and tongue means carried by said base means for interlocking with said groove means to secure said planar sections to one another and said base surface; a layer of resilient material interposed between the fastening strips and the base surface providing cushioning for the planar sections wherein said system comprises:

a fastener member having a head and a shank portion; a reduced portion of said shank adjacent said head being reduced in cross-section as compared to an enlarged portion of said shank; said enlarged portion being formed toward a free penetrating end of said shank so that said enlarged portion penetrates said fastening strip before said reduced portion in securing said fastening strips whereby said planar sections secured by said fastening strips move freely relative to the reduced cross-section portion of said fastening member on said resilient material interposed between the fastening strips and the base surface, thereby providing more uniform cushioning characteristics for the floor system.

12. The system of claim 11 wherein each said rabbet of said planar sections includes a horizontal side spaced above said head of said fastening member, and a clearance space defined between said horizontal rabbet side and said fastening member head sufficient to allow said fastening strip to move freely over said reduced portion of said fastening member.

13. A fastening system as in claim 11, wherein the fastening members are nails, each having a head and a shank portion, and wherein a portion of the shank adjacent the head is of reduced cross-section as compared to the rest of the shank for allowing the fastening strips and the planar sections rigidly attached to the fastening strips to move freely relative to the nails about the reduced cross-section portion of the nail on the resilient material interposed between the fastening strips and the base surface, thereby providing more uniform cushioning characteristics for the floor system.

14. A fastening system as in claim 11, wherein the fastening members are nails, each having a head and a shank portion, wherein spaced below the head, a circumferential ridge is carried on the shank portion such that upon driving of the nail through the fastening strip, the circumferential ridge increases the diameter of the hole in the fastening strip as the nail is driven through, thereby allowing the fastening strips and the planar sections rigidly attached to the fastening strips to move relative to the shank portion of the nail that is between the head and the circumferential ridge.

15. A fastening system as in claim 11, wherein the fastening members are screws, each having a head and a shank portion, and wherein a portion of the shrank adjacent the head is of reduced cross-section as compared to the rest of the shank for allowing the fastening strips and the planar sections rigidly attached to the fastening strips to move freely relative to the screws about the reduced cross-section portion of the screw on the resilient material interposed between the fastening strips and the base surface, thereby providing more uniform cushioning characteristics for the floor system.

* * * * *